United States Patent
Harada et al.

(10) Patent No.: US 8,121,397 B2
(45) Date of Patent: Feb. 21, 2012

(54) METHOD AND ITS APPARATUS FOR REVIEWING DEFECTS

(75) Inventors: Minoru Harada, Fujisawa (JP); Ryo Nakagaki, Kawasaki (JP); Kenji Obara, Kawasaki (JP)

(73) Assignee: Hitachi High-Technologies Corporation, Tokyo (JP)

( * ) Notice: Subject to any disclaimer, the term of this patent is extended or adjusted under 35 U.S.C. 154(b) by 392 days.

(21) Appl. No.: 12/416,273

(22) Filed: Apr. 1, 2009

(65) Prior Publication Data

US 2009/0252403 A1    Oct. 8, 2009

(30) Foreign Application Priority Data

Apr. 2, 2008   (JP) .................................. 2008-095657

(51) Int. Cl.
   *G06K 9/00*   (2006.01)
(52) U.S. Cl. ......... 382/149; 382/154; 382/145; 382/218
(58) Field of Classification Search .................. 382/141, 382/145, 149, 154, 218; 250/306–307, 310–311; 356/237.1–237.5
   See application file for complete search history.

(56) References Cited

U.S. PATENT DOCUMENTS

| | | | | |
|---|---|---|---|---|
| 6,476,388 B1 * | 11/2002 | Nakagaki et al. | ................. | 850/9 |
| 6,553,323 B1 * | 4/2003 | Obara et al. | .................... | 702/35 |
| 7,598,490 B2 * | 10/2009 | Kurihara et al. | ............... | 250/307 |
| 7,657,078 B2 * | 2/2010 | Nakagaki et al. | ............. | 382/148 |
| 7,834,317 B2 * | 11/2010 | Nakagaki et al. | ............. | 250/310 |
| 7,873,202 B2 * | 1/2011 | Kurihara et al. | ............... | 382/141 |
| 7,932,493 B2 * | 4/2011 | Harada et al. | .................. | 250/306 |

FOREIGN PATENT DOCUMENTS

| | | |
|---|---|---|
| JP | 2000-067243 | 3/2000 |
| JP | 2001-325595 | 11/2001 |
| JP | 2003-098114 | 4/2003 |
| JP | 2007-040910 | 2/2007 |

* cited by examiner

*Primary Examiner* — Sang Nguyen

(74) *Attorney, Agent, or Firm* — Antonelli, Terry, Stout & Kraus, LLP.

(57) ABSTRACT

A method for reviewing a defect on a sample involves the steps of imaging a defect image containing the defect in first magnification by using an image acquisition unit, synthesizing a reference image not containing the defect from the defect image, comparing the defect image acquired with the reference image synthesized to detect a defect applicant, executing a processing for classifying the defect applicant into a defect and a normal portion and imaging only the portion identified as the detect in second magnification. The method makes it possible to specify a defect position without error from the image taken in the first magnification and to image the defect in the second magnification when a large number of defects are observed within a short time by using the image acquisition unit.

12 Claims, 9 Drawing Sheets

LOW MAGNIFICATION DEFECT IMAGE

LOW MAGNIFICATION REFERENCE IMAGE

SYNTHETIC REFERENCE IMAGE

COMPARISON INSPECTION RESULT WITH LOW MAGNIFICATION REFERENCE IMAGE

COMPARISON INSPECTION RESULT WITH SYNTHETIC REFERENCE IMAGE

FIG.6

| No. | DATA SET NAME | DATA SET |
|---|---|---|
| 1 | DATA SET A | 601 |
| 2 | DATA SET B | |

602

| No. | IMAGE | IMAGING MAGNIFICATION | FRAME NUMBER | ACCELERATION VOLTAGE | PROBE CURRENT |
|---|---|---|---|---|---|
| 1 | | 12,000 | 4 | 800 | 50 |
| 2 | | 12,000 | 4 | 800 | 50 |
| 3 | | 15,000 | 4 | 800 | 50 |
| 4 | | 15,000 | 8 | 1,000 | 100 |
| 5 | | 15,000 | 8 | 1,000 | 150 |
| 6 | | 15,000 | 8 | 1,000 | 150 |

FIG.8

NORMAL PORTION IMAGE

| No. | IMAGE | IMAGING MAGNIFICATION | FRAME NUMBER | ACCELERATION VOLTAGE | PROBE CURRENT |
|---|---|---|---|---|---|
| 1 | | 12,000 | 4 | 800 | 50 |
| 2 | | 12,000 | 4 | 800 | 50 |
| 3 | | 15,000 | 4 | 800 | 50 |
| 4 | | 15,000 | 8 | 1,000 | 100 |
| 5 | | 15,000 | 8 | 1,000 | 150 |
| 6 | | 15,000 | 8 | 1,000 | 150 |

DELETE    OK

METHOD AND ITS APPARATUS FOR REVIEWING DEFECTS

INCORPORATION BY REFERENCE

The present application claims priority from Japanese application JP 2008-095657 filed on Apr. 2, 2008, the content of which is hereby incorporated by reference into this application.

BACKGROUND OF THE INVENTION

This invention relates to a method and its apparatus for reviewing defects on a sample by using image acquisition means.

To improve production yield in the manufacture of semiconductor devices, it has been of importance to quickly clarify the cause of occurrence of defects in the manufacturing process. A defect inspection apparatus and a defect reviewing apparatus have now been used in combination at present in the actual scene of the manufacture to analyze the defects. The defect inspection apparatus is the one that inspects semiconductor wafer to detect defects by using optical means or electron beams and outputs feature quantities of the defects detected and their coordinate information.

It is important for the defect inspection apparatus to inspect at a high speed a broad range on a semiconductor wafer. Therefore, the pixel sizes of the images to be acquired have been increased as much as possible (to result in lower resolution) so as to reduce the image data quantity and to keep high through-put. Though the approximate feature of the defect can be grasped by confirming the existence of the defect from the detected images of low resolution, the kind of the defect cannot be discriminated in detail in most cases. The reviewing apparatus is therefore employed to discriminate in detail the kind of the defects by acquiring the images of defects having relatively high resolution. The reviewing apparatus is the apparatus that images the image of the defect on the semiconductor wafer by using the output of the inspection apparatus and outputs the image of the defect having high resolution.

The defect size has often reached the order of dozens of nm (nanometers) with the progress of miniaturization in the semiconductor manufacturing process and resolution of the order of several nm is necessary to review in detail the defects. Therefore, a reviewing apparatus using a scanning electron microscope (hereinafter called "review SEM") has gained a wide application in recent years. Automation of the inspection operation has been desired in the mass-production line of semiconductors and the review SEM has an ADR (Automatic Defect Review) function of automatically collecting images of defect coordinates inside a wafer and an ADC (Automatic Defect Classification) function of automatically classifying the images acquired.

The ADR function is the one that automatically collects the images taken in high magnification of defect portions represented by the defect coordinates by using the defect inspection apparatus. The problem that arises hereby is an error between the defect coordinates outputted by the defect inspection apparatus and actual defect coordinates. Because variance of about ±4 [μm] generally exists as the error, there is the possibility that the defect does not enter the visual field when the defect coordinates outputted by the defect inspection apparatus are taken in high magnification (such as 50,000 times) having a visual field of about 2.5 [μm]. Therefore, imaging is made first in low magnification (such as 15,000 times) of a visual field of about 9 [μm]. The defect position is then specified from this low magnification image and finally, the defect coordinates specified on the image of the low magnification are taken in high magnification (such as about 50,000 times) to acquire the high magnification image of the defect.

One of the known methods for specifying the defect position is a comparison inspection that compares a defect image of a defect portion taken in low magnification with a reference image obtained by imaging a portion at which the same pattern as the defect portion is formed and which is taken in low magnification, and detects the difference of both images as a defect. Since a plurality of the same chips are arranged on a semiconductor wafer, it is possible to use, as a reference image, the image of a position spaced apart by one chip from the coordinates at which the defect exists and taken in low magnification. When the same wiring pattern is periodically formed as in a cell portion of a memory, the image of the same wiring pattern can be used as the reference image.

As an aperture ratio of semiconductor wafers has become greater in recent years, the number of defects to be reviewed per wafer has increased, too. In addition, since through-put of the review apparatus is lower than that of the inspection apparatus, the ADR operation must be sped up.

A long time is generally necessary in the ADR operation in the stage movement from an initial position to a target position and in imaging of both reference and defect images. To speed up the ADR operation, a method that skips several of the imaging procedures will be effective besides speed-up of these process steps. The procedure to be skipped is generally imaging of the reference image. Several methods have been proposed such as a method that prepares in advance a reference image and a method that synthesizes the reference image from the defect image and conducts comparison inspection.

The former method is described in JP-A-2000-67243. This method stores in advance a periodic pattern as a reference image, conducts the comparison inspection by using this image and the defect image and specifies a defect position.

The latter is described in JP-A-2003-98114. The method compares local regions having similar appearances on a defect image, calculates reliability of the defect detection of their difference region on the basis of probability distribution of the normal portion and detects a difference region having high reliability as the defect. Another method is described in JP-A-2007-40910. The method synthesizes a reference image by utilizing repetition periodicity of circuit patterns imaged in the defect image and detects the defect through the comparison inspection with the reference image so synthesized.

As a method for conducting the comparison inspection by using the defect image and the reference image, JP-A-2001-325595 discloses a method that executes a binarization processing for the difference image between the two images and detects the defect portion.

When the method of JP-A-2007-40910 for synthesizing the reference image by utilizing the periodicity of the circuit pattern contained in the defect image from the defect image acquired by imaging the region containing the defect is used, the reference image cannot be synthesized correctly in a region not having periodicity and existing at a part inside the image (hereinafter called "peculiar portion"). The explanation will be given hereby by way of example about the case where the reviewing method of JP-A-2007-40910 is applied to the low magnification defect image 701 containing a defect 705 and a peculiar portion 702 inside an image shown in FIG. 7.

A reference numeral 704 is synthesized in S703 by utilizing the periodicity of the patterns contained in the low magnification defect image 701 acquired by imaging with SEM and a difference image between the defect image 701 and the reference image 704 synthesized is determined as a comparison inspection in S706. A binary difference image 707 is generated by binarizing this difference image and a defect 709 is detected from this binary difference image 707. Not only a defect portion 709 but also a peculiar portion 708 is detected from the binary difference image 707 acquired by binarizing the difference image.

To prevent the peculiar portion 708 from being detected wrongly as the defect, the invention of JP-A-2007-40910 regards the difference portion acquired by the comparison inspection as a defect applicant, calculates a feature quantity for each defect applicant and detects only a real defect by identifying the feature quantities.

The peculiar portion of the circuit pattern represented by reference numeral 702 in FIG. 7 is believed to have a variety of features resulting from the difference of production processes of semiconductors. To improve a correct solution ratio of judgment in the judgment method using the feature quantities, greater feature quantities must be calculated from the image. However, this results in the increase of the processing time of the defect detection processing because a long processing time is generally necessary for calculating feature quantities from images. When unimaginable peculiar portions exist, the peculiar portions may most possibly be detected as the defect because the method can correctly judge only the peculiar portions having the features that are assumed in advance.

SUMMARY OF THE INVENTION

The invention provides a defect reviewing apparatus having high through-put.

In other words, the invention provides a method for reviewing a defect of a semiconductor device that involves the steps of imaging in first magnification a defect on the semiconductor device detected by an inspection made by an inspection device by using a scanning electron microscope to acquire an image of a region containing the defect; synthesizing a reference image from images of the region containing the defect of the first magnification acquired; comparing the image of the region containing the defect in the first magnification with the reference image synthesized and extracting an image of a defect applicant; judging whether or not an image of a real defect in second magnification greater than the first magnification is detectable from the image of the defect applicant extracted; acquiring an enlarged image of the defect applicant by imaging in the second magnification the defect applicant extracted when the image of the real defect in the second magnification is judged as detectable; acquiring a reference image by imaging in the first magnification a region not containing the defect of the semiconductor device by using the scanning electron microscope when the image of the real defect in the second magnification is judged as undetectable; comparing the image containing the defect in the first magnification acquired with the reference image acquired by imaging in the first magnification, and detecting a defect applicant; and acquiring an enlarged image of the defect applicant by imaging in the second magnification the defect applicant detected; wherein the step of judging whether or not the image of the real defect in the second magnification is detectable retrieves images similar to the image of the defect applicant extracted from among images of normal portions of the semiconductor device that are stored in advance, judges the image of the real defect in the second magnification as undetectable when the similar images of the normal portions exist, and judges the images of the real defect in the second magnification as detectable when the similar images of the normal portions do not exist.

The invention provides also a method for reviewing a defect of a semiconductor device that involves the steps of imaging in first magnification a defect on the semiconductor device detected by an inspection made by an inspection device by using a scanning electron microscope to acquire a low magnification defect image of a region containing the defect; synthesizing a reference image not containing the defect from the low magnification defect image acquired; extracting a defect applicant from the low magnification defect image and the reference image synthesized; retrieving an image similar to the image of the defect applicant from among images of normal portions stored in advance; and imaging a high magnification defect image of the defect applicant extracted in second magnification higher than the first magnification by using the scanning electron microscope when the similar image cannot be found out by the retrieval.

Furthermore, the invention provides an apparatus for reviewing a defect of a semiconductor device that includes scanning electron microscope means for imaging a desired region on a semiconductor device and acquiring an SEM image of the desired region; low magnification defect image acquisition means for imaging in first magnification a defect on the semiconductor device detected through inspection using an inspection apparatus by controlling the scanning electron microscope means, and acquiring an image of a region containing the defect; reference image synthesis means for synthesizing a reference image from the image of the region containing the defect of the first magnification acquired by controlling the scanning electron microscope means by the low magnification image acquisition means; first defect applicant extraction means for comparing the image of the region containing the defect of the first magnification acquired by controlling the scanning electron microscope means by the low magnification defect image acquisition means with a reference image synthesized by the reference image synthesis means, and extracting an image of a defect applicant; judgment means for judging whether or not an image of a real defect of second magnification greater than the first magnification is detectable from the image of the defect applicant extracted by the first defect applicant extraction means by controlling the scanning electron microscope means; first enlarged image acquisition means for imaging the defect applicant extracted in the second magnification and acquiring an enlarged image of the defect applicant when the image of the real defect in the second magnification is judged as detectable by controlling the scanning electron microscope means; reference image acquisition means for controlling the scanning electron microscope means, imaging in the first magnification a region not containing the defect of the semiconductor device and acquiring a reference image when the image of the real defect in the second magnification is judged as undetectable by controlling the scanning electron microscope means; second defect applicant extraction means for comparing the image containing the defect of the first magnification acquired by controlling the scanning electron microscope means by the low magnification defect image acquisition means with the reference image acquired by controlling the scanning electron microscope means by the reference image acquisition means, and extracting a defect applicant; second enlarged image acquisition means for imaging in the second magnification the defect applicant extracted, and acquiring an enlarged image of the defect applicant by controlling the scanning electron microscope means; and storage means for storing the images of normal portions of the semiconductor device; wherein the judgment means retrieves images similar to the image of the defect applicant extracted by the first defect applicant extraction means from among images of normal portions of the semiconductor device that are stored in advance in the storage means, judges the image of the real defect in the second magnification as undetectable when the similar images of the normal portions exist, and judges the images of the real defect in the second magnification as detectable when the similar images of the normal portions do not exist.

The invention further provides an apparatus for reviewing a defect of a semiconductor device that includes scanning electron microscope means for imaging a desired region on a semiconductor device and acquiring an SEM image of the desired region; low magnification defect image acquisition means for imaging in first magnification a defect on the semiconductor device detected through inspection using an inspection apparatus by controlling the scanning electron microscope means, and acquiring a low magnification defect image of a region containing the defect; reference image synthesis means for synthesizing a reference image not containing a defect from the low magnification defect images acquired by controlling the scanning electron microscope means by the low magnification defect image acquisition means; first defect applicant extraction means for comparing the image of the region containing the defect of the first magnification acquired by controlling the scanning electron microscope means by the low magnification defect image acquisition means with a reference image synthesized by the reference image synthesis means, and extracting an image of a defect applicant; storage means for storing the images of normal portions of the semiconductor device; similar image retrieval means for retrieving an image similar to the image of the defect applicant extracted by the first defect applicant extraction means from among the images of the normal portions stored in the storage means; and first control means for controlling the scanning electron microscope means, imaging in second magnification higher than the first magnification the defect applicant extracted and acquiring a high magnification defect image of the defect applicant when an image similar to the images of the defect applicant cannot be found out from among the images of the normal portions stored in the storage means by the similar image retrieval means.

The invention makes it possible to omit imaging of the reference image when the defect is detected by synthesizing the reference image from the defect image and to efficiently review the defect. The invention makes it also possible to prevent erroneous detection by conducting identification for the defect applicants detected by the comparison inspection with the reference image synthesized from the defect image and to conduct automatic defect review with a higher detection ratio.

These and other objects, features and advantages of the invention will be apparent from the following more particular description of preferred embodiments of the invention, as illustrated in the accompanying drawings.

BRIEF DESCRIPTION OF THE DRAWINGS

FIG. 6 shows an example of a construction of the normal portion image database according to the first embodiment of the invention;

FIG. 8 shows a display window of a user interface for managing the normal portion image database in the first embodiment of the invention.

DESCRIPTION OF THE EMBODIMENTS

Embodiments for executing the invention will be hereinafter explained with reference to the accompanying drawings.

Embodiment 1

A semiconductor wafer defect reviewing apparatus (review SEM) using a scanning electron microscope will be explained as a first embodiment of the invention.

Figure 1:
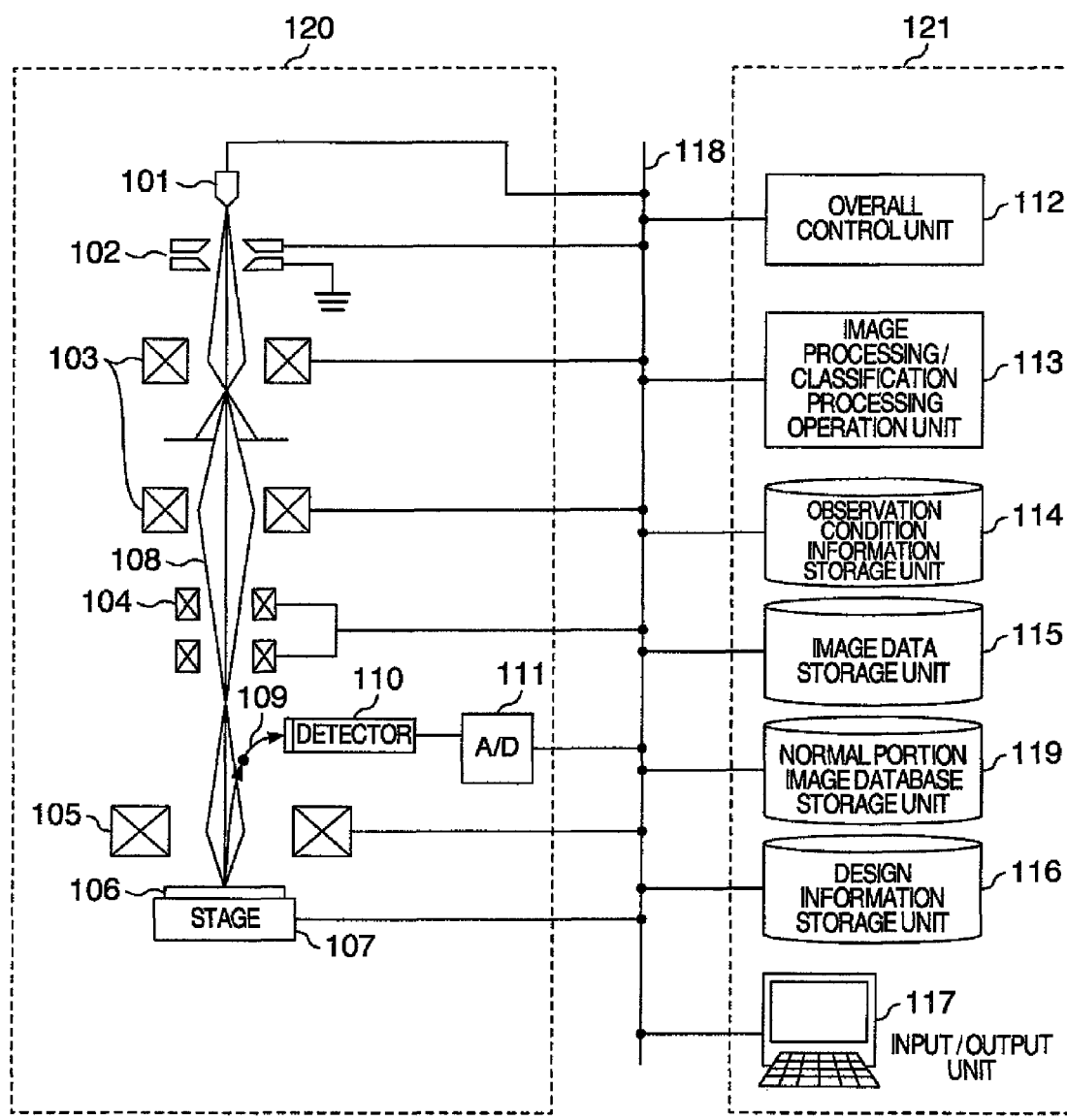
FIG. 1 is a block diagram showing a rough construction of a defect reviewing apparatus for semiconductor devices.

FIG. 1 shows an apparatus construction of the review SEM according to the invention. The review SEM according to the invention includes an SEM image acquisition unit 120 and a signal processing unit 121 that are connected to one another through buses 118. Reference numeral 101 in the SEM image acquisition unit 120 denotes an electron source for generating primary electrons 108, reference numeral 102 denotes an acceleration electrode for accelerating the primary electrons, reference numeral 103 denotes a convergent lens for converging the primary electrons, reference numeral 104 denotes a deflector for scanning and deflecting two-dimensionally the primary electrons and reference numeral 105 denotes an objective lens for converging the primary electrons onto a sample 106. Reference numeral 107 denotes a stage capable of moving inside an X-Y plane to which the sample is mounted. Reference numeral 110 denotes a detector for detecting secondary electros 109 generated from the sample. Reference numeral 111 denotes a digitizing unit for digitizing (executing A/D conversion for) the detected signals. These constituent members are connected to an overall control unit 112 of the signal processing unit 121 through the buses 118.

On the other hand, the signal processing unit 121 includes an operation unit 113 for executing an image processing and a classification processing for the images acquired by the SEM image acquisition unit 120, a reviewing condition information storage unit 114 for storing reviewing condition information (imaging recipe) including coordinate information acquired by inspecting a defect as an automatic reviewing object by the defect reviewing apparatus among the defects detected in advance by other defect reviewing apparatus, an image data storage unit 115 for storing image data, a design information storage unit 116 for storing design information of semiconductors, a normal portion image database storage unit 119 for storing a normal portion image database 1190 and an input/output unit 117 for outputting data from devices and apparatuses for giving instructions to an imaging device such as a keyboard and a mouse. These constituent members are connected to one another through the buses 118.

Next, ADR in the review SEM in the invention will be explained. To begin with, a semiconductor wafer 106 is mounted to the stage 107 prior to imaging. An operator selects a recipe to be used for the measurement from among a plurality of recipes registered to the reviewing condition information storage unit 114 and instructs the overall control unit 112 to execute ADR and ADC under the condition stored in the selected recipe. It will be assumed hereby that the recipes registered to the reviewing condition information storage unit 114 store various kinds of electro-optical conditions for imaging (such as acceleration voltage, probe current, imaging magnification, etc). The overall control unit 112 then reads the coordinates information of the defect as the automatic reviewing object from the reviewing condition information storage unit 114. Processing of steps S201 to S211 to be explained next is executed to collect the defect image by using the coordinates of each defect read.

Figure 2:
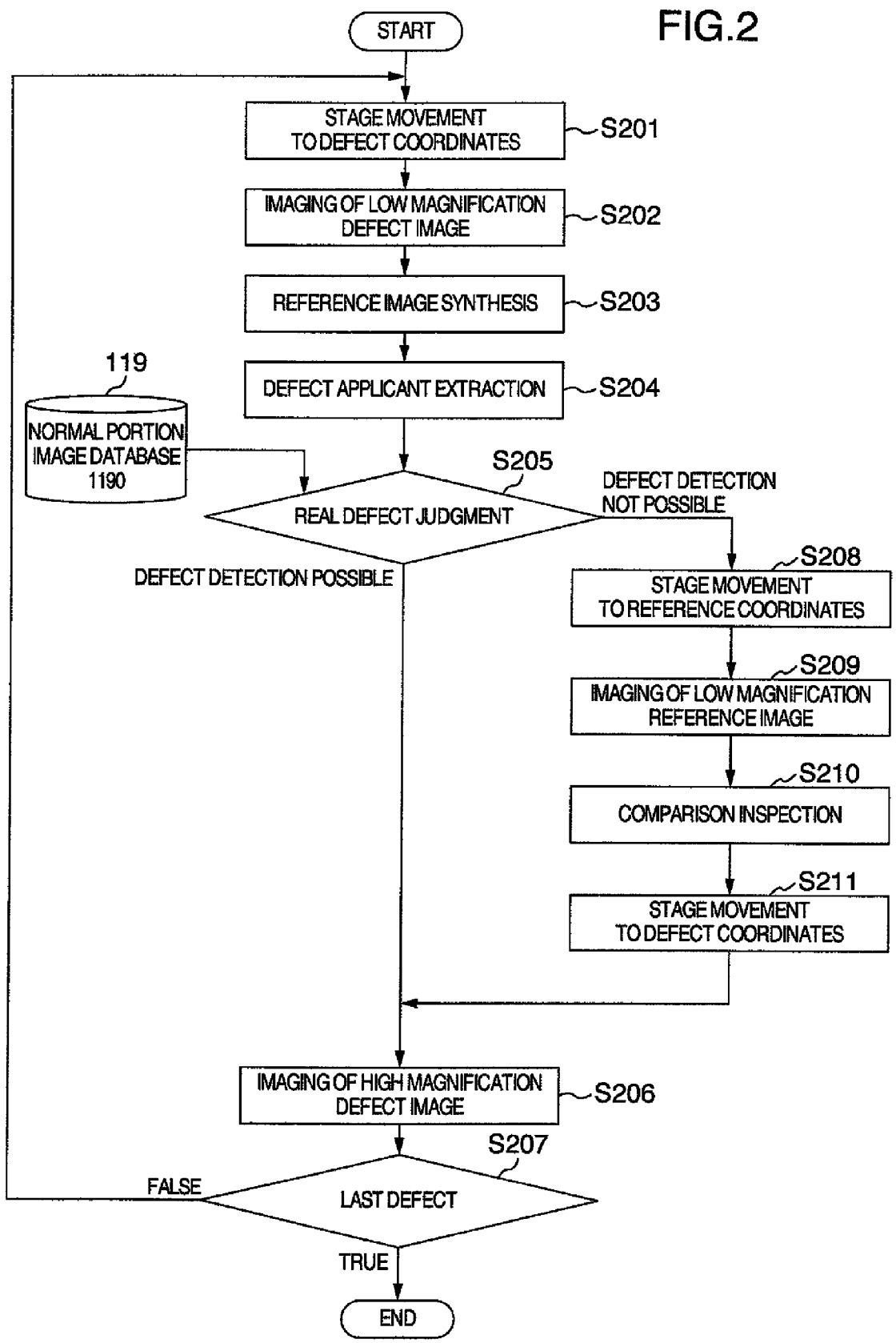
FIG. 2 is a flowchart showing the flow of an ADR processing according to a first embodiment of the invention.

FIG. 2 shows the flow of the ADR processing for automatically acquiring the defect image on the semiconductor wafer. The stage is first moved so that the defect coordinates detected by other defect reviewing apparatus are contained in the imaging visual field for imaging the image of the defect (S201). Imaging is then carried out. Generally, an error of about ±4 [μm] exists between the defect image read out from the reviewing condition information storage unit 114 and inspected and detected in advance by other reviewing apparatus and the real defect coordinates. Therefore, imaging is carried out in a low magnification (about 15,000 times) of the visual field of 9 [μm] so that the defect falls within the visual field (S202). When imaging is made in a low magnification, however, the defect cannot be reviewed in detail. For this reason, the defect position is specified from the image taken and the coordinates are imaged in a high magnification (about 100,000 times), for example (S206).

A method of specifying the defect position from the image containing the defect taken in a low magnification (hereinafter called "low magnification defect image") will be explained.

To specify the defect position, a method is known that compares defect coordinates on the semiconductor wafer with an image of a position at which a similar pattern is formed and which is taken in the same low magnification (hereinafter called "low magnification reference image"). The afore-mentioned patent document JP-A-2007-40910 describes a method for synthesizing the reference image from the low magnification defect image by utilizing periodicity of a circuit pattern. To reduce the imaging time of the reference image and the stage moving time for this purpose and to improve through-put, the invention employs a method that specifies a defect position from a defect image without using the low magnification reference image described in this patent document.

In step S203, the reference image is synthesized from the defect image by utilizing the periodicity of the circuit pattern (the resulting reference image will be called hereinafter "synthetic reference image") and a defect applicant is detected by comparing and inspecting the low magnification defect image with the synthetic reference image (S204). The defect applicant contains the normal portion that is detected because the synthesis of the reference image cannot be made correctly. Therefore, the real defect judgment processing S205 is carried out by using the normal portion image database storage unit 119 to judge whether the defect applicant is the defect or the normal portion.

When the defect can be detected in the real defect judgment processing S205, high magnification imaging is carried out by using the coordinates (S206). When the applicant that can be judged as the defect does not exist and detection of the defect is not possible, the stage is moved to the position at which the same pattern as the position, where the defect exists, is formed (S208) to acquire the low magnification reference image and to execute the comparison inspection (S208) and the reference image is taken in a low magnification (S209).

Next, the comparison inspection of the low magnification image with the low magnification reference image is carried out and the defect position is specified (S210). At this point of time, the stage must be again moved to the defect coordinates so as to image the specified defect position in a high magnification because the stage exists at the imaging position of the reference image (S211). After the movement of the stage is complete, the defect coordinates specified are imaged in a high magnification (S206). As a result of this process, it is possible to acquire an image in which the defect portion is taken in the high magnification for one defect. In ADR, this processing is repeatedly carried out for all the defect coordinates (until logical expression S207 becomes true).

Figure 3:
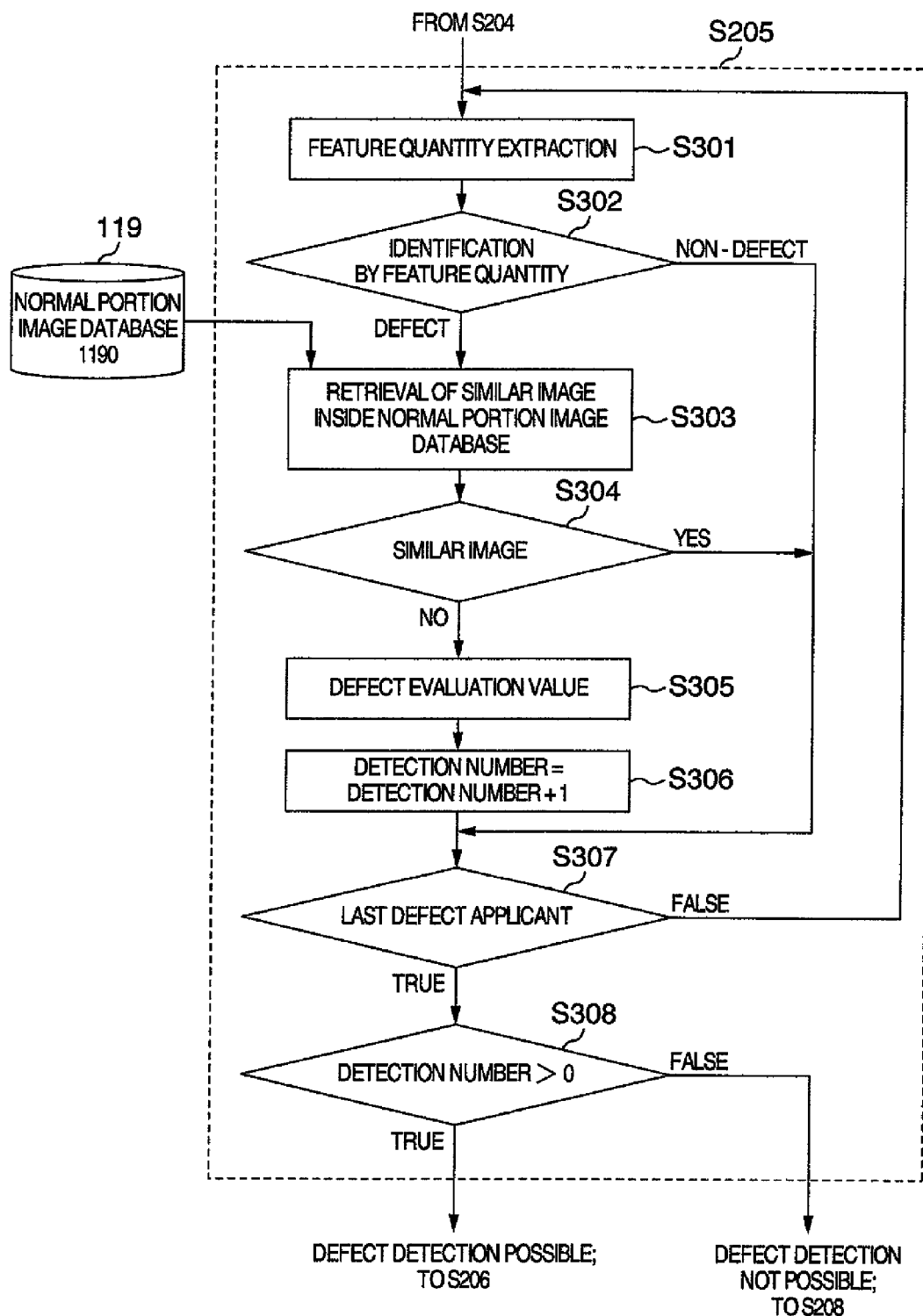
FIG. 3 is a flowchart showing the flow of a real defect judgment processing according to the first embodiment of the invention.

The real defect judgment processing S205 for judging whether the detected defect applicant is the defect or the normal portion will be explained with reference to FIG. 3. A region is set so that the defect applicant is contained in the low magnification defect image taken in S202 (which set region will be hereinafter called "defect applicant region"). The difference of appearance in the defect applicant region is quantized as a feature quantity (S301) and the defect and the normal portion are discriminated by conducting identification by using the feature quantity so quantized (S302). Furthermore, the defect applicant judged as the defect by the judgment using the feature quantity is judged by using the image of the normal portion that is in advance stored in the normal portion image database storage unit 119.

In the judgment using the image database 1190 of the normal portion stored in the normal portion image database storage unit 119, the image of the defect applicant region is sliced from the low magnification defect image acquired in step S202 and whether or not a similar image exists in the images of the normal portion stored in the normal portion image database storage unit 119 is searched (S303). Because all the images stored in the normal portion image database storage unit 119 are the image of the normal portion, the defect applicant is judged as the normal portion when the similar image exists (S304). When the similar image does not exist, on the other hand, judgment as a defect is possible. Therefore, an evaluation value representing defect probability (defect probability evaluation value) is calculated (S305) and a variable (number of detections) for counting the number of defect applicants detected as the defect is incremented by 1 (S306).

The processing described above is repeatedly executed for all the defect applicants (until logical expression becomes true in S307). Finally, when one or more defect applicants judged as the defect exist (true in S308), only the defect applicant having the highest defect probability evaluation value is judged as the defect and the processing proceeds to the high magnification defect image imaging step S208 in FIG. 2. When no defect applicant judged as the defect exists, on the other hand (false in S308), defect detection is judged as impossible and the processing proceeds to the step S208 for moving the stage to the reference coordinates shown in FIG. 2.

Next, the retrieving method of the similar images in S303 will be explained. Similarity of the images of the defect applicant regions from the low magnification defect images in S204 to all the images inside the normal portion stored in the normal portion image database storage unit 119 is calculated. When the similarity is higher than a predetermined value, similar images are judged as existing. A coefficient of correlation between the defect applicant image and the image of the normal portion stored in the normal portion image database storage unit 119 is used as the similarity.

Because the imaging magnification and the slicing method are not constant for the image of the defect applicant sliced in S204 and the image of the normal portion stored in the normal portion image database storage unit 119, the difference of magnification is corrected by enlarging or diminishing the images and the square sum of the coefficient of correlation and the difference is calculated after positioning is made between the two images. When the low magnification defect image of the defect applicant extracted in S204 and the imaging condition of the image of the normal portion stored in the normal portion image database storage unit 119 (such as number of addition frames, acceleration voltage, probe current, etc) are outside predetermined ranges, they are deleted from the object of retrieval.

The database of the image data of the normal portion (normal portion image database) 1190 stored in the normal portion image database storage unit 119 must be generated before the execution of the ADR. To efficiently execute the real defect judgment processing S205, it is preferred to register only the peculiar portion error judged in the judgment using the feature quantity. A generation method of the normal portion image database 1190 stored in the normal portion image database storage unit 119 will be explained.

It is customary in the fabrication of semiconductor devices to review a large number of wafers processed serially in the same fabrication process and in the wafers of the same or analogous fabrication process, it is possible to use one normal portion image database 1190. Therefore, when the normal portion image database 1190 is generated by using a small number (1 to about 3) of wafers of the same process, the database 1190 can be used in a large number of remaining wafers.

Figure 4:
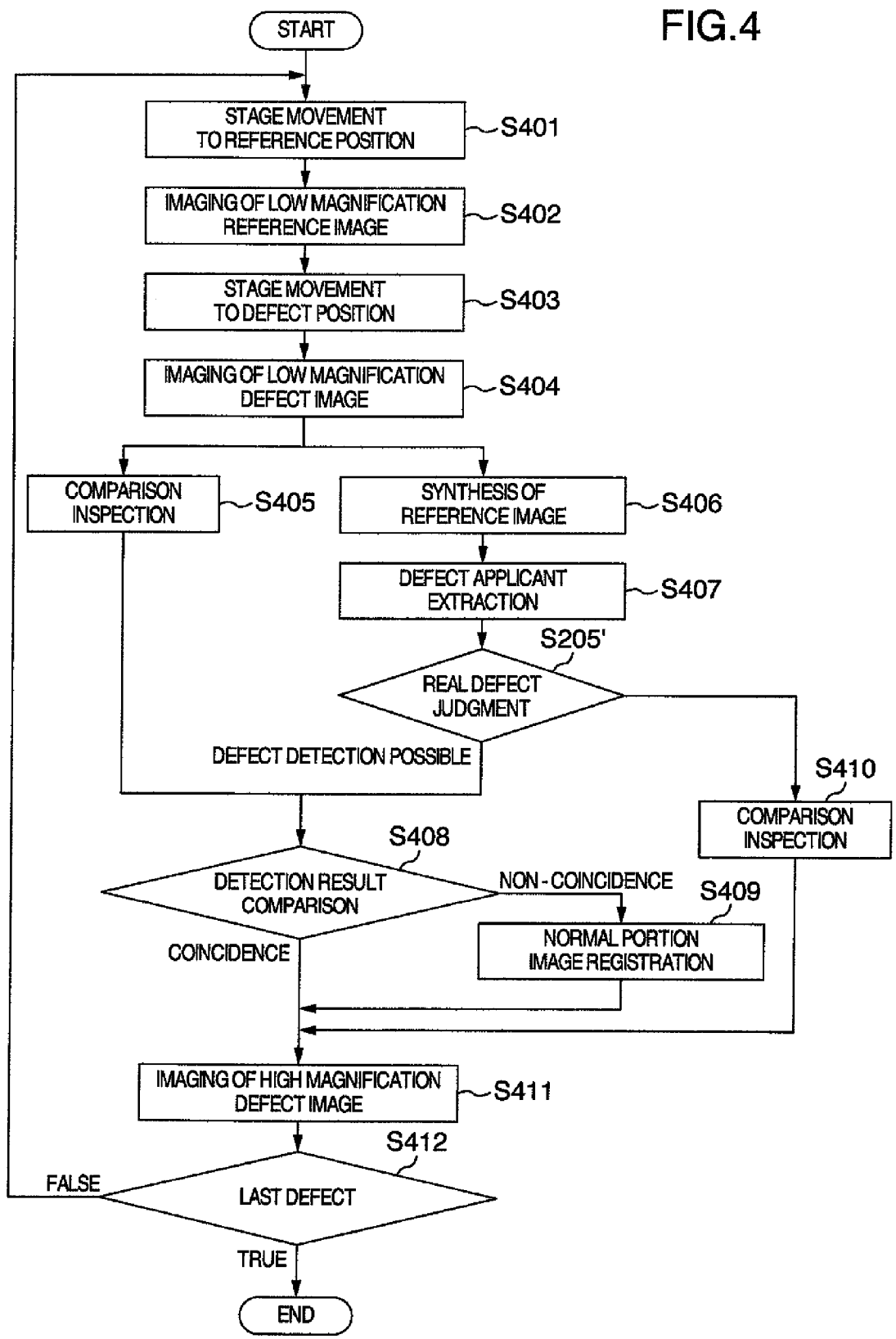
FIG. 4 is a flowchart showing the flow of an ADR processing for generating a normal portion image database according to the first embodiment of the invention.

A method of automatically generating the normal portion image database 1190 stored in the normal portion image database storage unit 119 will be explained. An ADR processing for generating the normal portion image database 1190 shown in FIG. 4 is executed by using one or a plurality of wafers of the wafers of the same process as the review object. The processing flow shown in FIG. 4 is analogous to the processing flow shown in FIG. 2 but is different in that the low magnification reference image is taken for all the defect applicants as the object of ADR.

The processing flow shown in FIG. 4 will be explained. The following two defect detection methods are executed either in parallel or in series. In the first method, the stage is moved to the reference image imaging position (S401) and the reference image is taken in low magnification (S402). Next, the stage is moved to the defect image imaging position (S403) and the defect image is taken in low magnification (S404). The reference image is synthesized from the low magnification defect image (S406) and the defect applicant is detected by comparison and inspection of the low magnification image and the synthetic reference image (S407). The defect position is specified by a real defect judgment processing S205' similar to the real defect judgment method explained with reference to FIG. 3. In the second method, the low magnification reference image acquired in S402 and the low magnification defect image acquired in S404 are compared and inspected (S405) to detect the defect.

Next, whether or not the results of both defect detection methods are coincident is judged (S408). When they are coincident, the defect coordinates are imaged in high magnification (S411). When they are not, the image of the defect applicant region is sliced from the low magnification reference image for the defect applicant judged as the defect by the real defect judgment processing S205' and is registered to the normal portion image database 1190 (S409).

When defect detection is judged as impossible in the real defect judgment processing S205', on the other hand, comparison inspection is executed by comparing the low magnification reference image acquired in S402 with the low magnification defect image acquired in S404 (S410) in the same way as the processing in the comparison inspection in S405 and the defect so detected is imaged in high magnification (S411).

The processing described above is repeatedly executed for all the defects of the object wafer (until the logical expression become true in S412). In consequence, the generation of the normal portion image database 1190 can be made while the images of the defection portions imaged in high magnification are being acquired.

When the judgment result reveals that the number of wrong judgments becomes sufficient small in the real defect judgment processing and the image registration to the normal portion image database 1190 is no longer necessary, the ADR processing is applied to the subsequent wafers in accordance with the processing flow shown in FIG. 2. When the wrong judgment ratio of the real defect judgment is automatically calculated and falls below a predetermined threshold value, the processing may well be switched automatically to the ADR processing shown in FIG. 2.

A detection result comparison processing S408 and a normal portion image registration processing S409 in the ADR processing for generating the normal portion image database shown in FIG. 4 will be explained with reference to FIG. 5. It will be hereby assumed, by way of example, that a peculiar portion 502 and a defect 504 are imaged in the low magnification defect image 501 (FIG. 5A) acquired in S404. In this case, a peculiar portion 505 similar to the low magnification defect image 501 exists in the low magnification reference image 504 acquired in S402 (FIG. 5B) but the defect does not exist. When the reference image 506 (FIG. 5C) is synthesized by step S406, the defect portion can be excluded but the peculiar portion is excluded at the same time, too.

Only the defect 508 is detected in the difference image 507 (FIG. 5D) after binarization acquired by the comparison inspection of the low magnification defect image and the low magnification reference image in S405. On the other hand, two defect applicants, that is, a peculiar portion 510 and a defect 511, are extracted from the difference image 509 (FIG. 5E) after binarization acquired by the comparison inspection of the low magnification defect image 501 and the synthetic reference image 506 in S407. The explanation will be continued further on the assumption that the peculiar portion 510 is judged as the defect by the real defect judgment processing in S205'.

Next, the results of the two defect detection systems (result of comparison inspection in S405 and result of real defect judgment in S205') are compared in S408. In this comparison, whether or not both results are coincident is judged through overlap of the two regions acquired by binarization. Because the two regions, that is, the defect 508 detected in S405 and 510 judged as the defect in S205', do not overlap with each other, both are judged as detecting different regions.

Figure 5A:
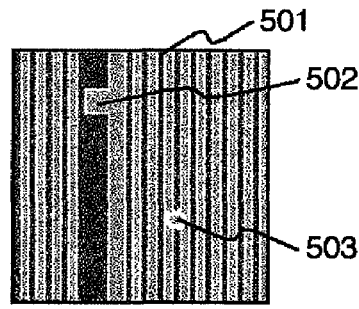
FIG. 5A shows a low magnification defect image acquired in S404 of the flowchart in FIG. 4.
Figure 5B:
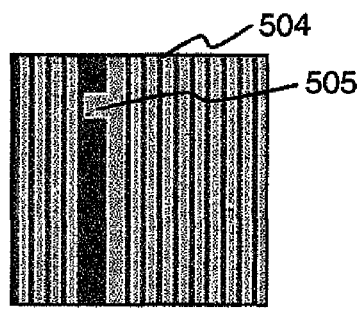
FIG. 5B shows a low magnification reference image acquired in S402 of the flowchart in FIG. 4.
Figure 5C:
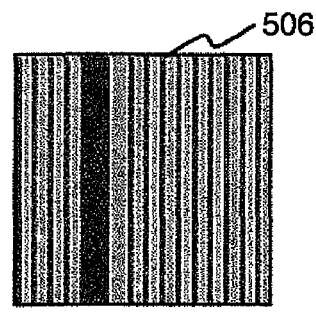
FIG. 5C shows a reference image synthesized in S406 of the flowchart in FIG. 4.
Figure 5D:
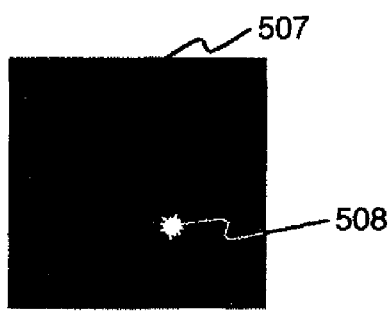
FIG. 5D shows a difference image after binarization acquired by a comparison inspection of the low magnification defect image (FIG. 5A) with the low magnification synthetic reference image (FIG. 5B) in S405 of the flowchart in FIG. 4.
Figure 5E:
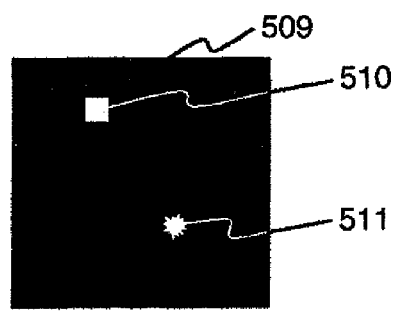
FIG. 5E shows a difference image after binarization acquired by a comparison inspection of the low magnification defect image (FIG. 5A) with the synthetic reference image (FIG. 5C) in S407 of the flowchart in FIG. 4.
Figure 5F:
FIG. 5F shows a partial region.
Figure 7:
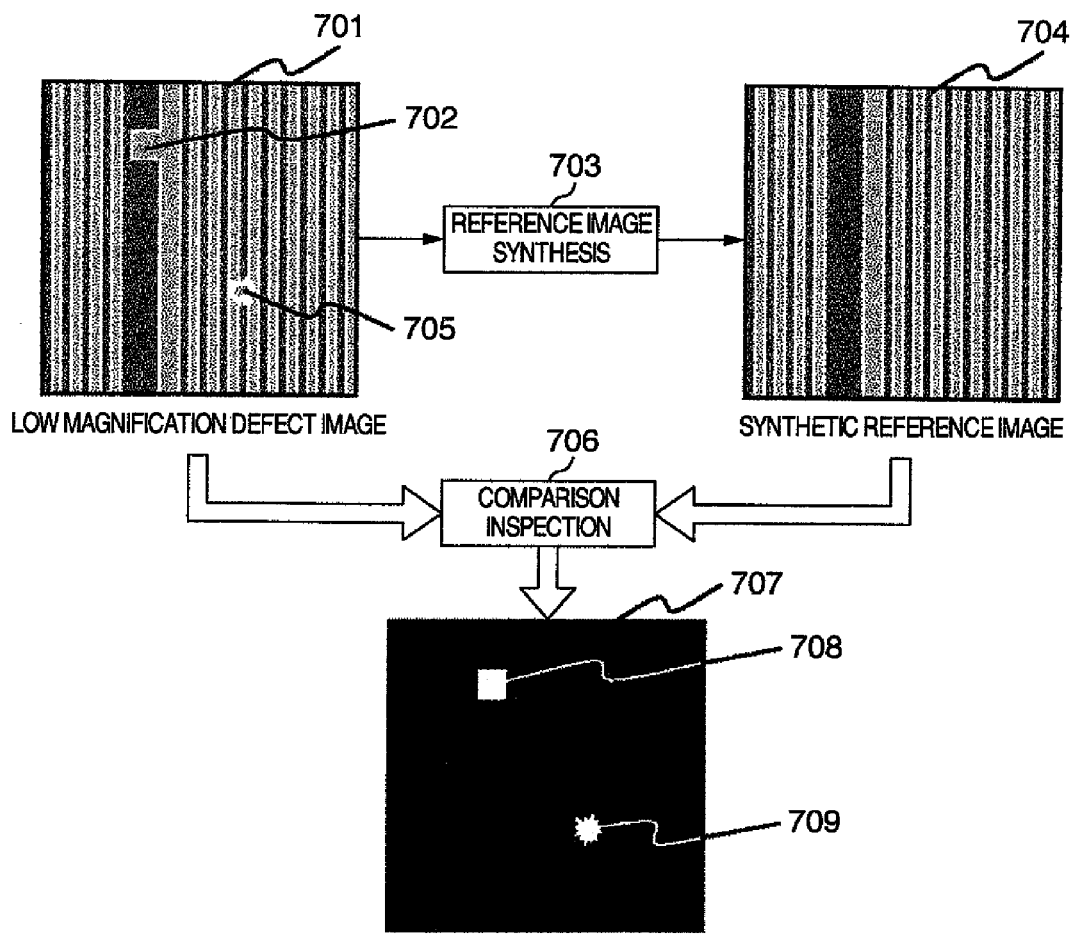
FIG. 7 shows an example where a defect is detected by conducting a comparison inspection by using a low magnification defect image and a synthetic reference image synthesized from this low magnification defect image.

The case where the peculiar portion 502 detected in the low magnification defect image 501 and the peculiar portion 505 detected in the low magnification reference image 504 are detected in the difference image 507 as the comparison result between the low magnification defect image 501 and the low magnification reference image 504 as shown in FIG. 5D does not generally exist. Therefore, when both are judged as detecting other regions, the peculiar portion 510 can be regarded as the wrong detection in the difference image 509 as the comparison result with the synthetic reference image 508. A partial region is therefore set so that the peculiar portion 510 can be contained and the image 512 (FIG. 5F) of the partial portion containing the low magnification reference image 504 to the peculiar portion 505 is sliced and is registered as the normal portion image to the database 1190.

The image is extracted from the low magnification reference image 504 so as to prevent the image of the defect portion from being registered as the normal portion image when the defect is detected only through the comparison of the low magnification defect image 501 with the synthetic reference image 508. The imaging magnification of the low magnification reference image and the imaging condition (such as the number of addition frames, acceleration voltage, probe current, etc) are stored simultaneously with the registration of the image.

When the region in which the peculiar portion exists is known in advance and when the number of patterns of the peculiar portions is small, the time required for generating the normal portion image database 1190 can be reduced by manually generating the normal portion image database 1190. First, the portion at which the peculiar portion exists is imaged in low magnification by using the SEM through the user operation. Next, the user designates the region of the peculiar portion of the pattern on the display screen of the input/output unit 117 displaying the SEM image. The operation unit 113 slices the region designated on the display screen of the input/output unit 117 from the SEM image taken and registers it to the normal portion image database 1190.

The structure of the normal portion image database 1190 will be hereinafter explained. The normal portion image database 1190 can contain a plurality of data sets and each data set can contain a plurality of records as sets each of which contains the normal portion image registered and the imaging condition. Reference numeral 601 in FIG. 6 represents an example of the normal portion image database 1190. Reference numeral 602 represents an example of the data set contained in 601. The user designates the data set used for the ADR processing in the recipe.

To allow the user to manage the image data of the normal portions registered to the normal portion image database 1190, the defect reviewing apparatus according to the invention includes a user interface such as the one shown in FIG. 8. The user is able to confirm the list of the normal portion images by using 801 of the user interface 800 and to delete those images which are judged as unnecessary by using a delete button 802. When the content corrected on the user interface 800 is registered to the normal portion image database 1190, the user can register the content by clicking an OK button 803 displayed on the display screen by using a mouse.

The above explains the embodiment that uses the scanning electron microscope but image acquisition units other than the scanning electron microscope such as an optical microscope may be used as image acquisition means, too.

Embodiment 2

A review system having the same hardware construction as that of the first embodiment and the ADR processing function shown in FIG. 2 will be explained as Embodiment 2.

Figure 9:
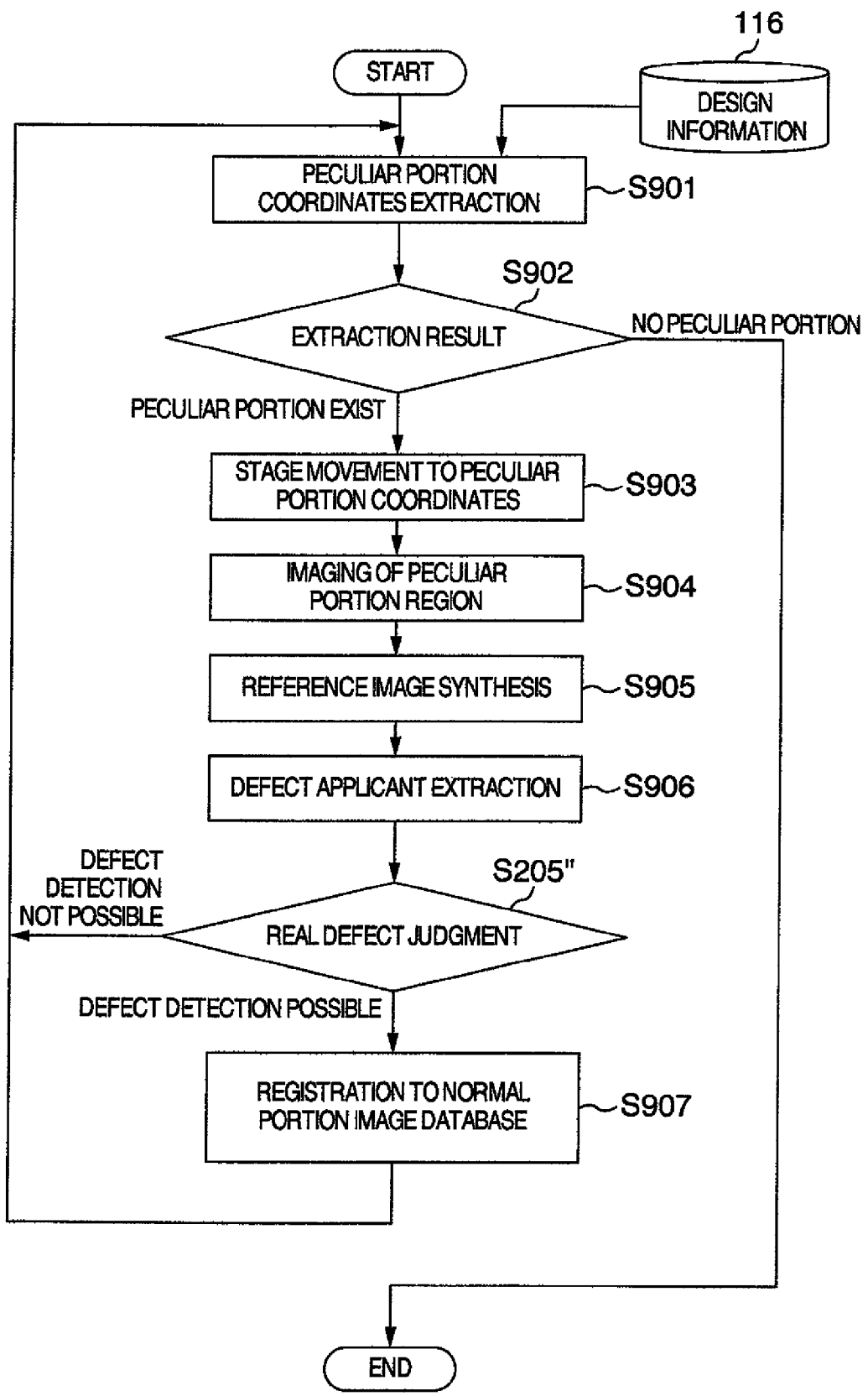
FIG. 9 is a flowchart showing the flow of a generation processing for generating the normal portion image database by using semiconductor design information in a second embodiment of the invention.

The first embodiment represents the method that automatically generates the normal portion image database by executing the ADR processing for generating the normal portion image database. A method for automatically generating the normal portion image database on the basis of design information of semiconductors will be hereinafter explained with reference to FIG. 9.

In the construction of the review SEM shown in FIG. 1, the operation unit 113 analyzes the geometric information of the circuit pattern imaged by the SEM image acquisition unit 120 from the design information of the semiconductor devices stored in the storage unit 116 and extracts the coordinates of the peculiar portion existing inside the region having periodicity (S901). Next, when the peculiar portion is judged as existing as a result of extraction (S902), imaging of the peculiar portion is carried out. However, errors such as an error of wafer alignment and a control error of the stage generally exist on the coordinates in the design information and the imaging coordinates acquired by imaging the SEM image acquisition unit 120. Therefore, after the stage is moved to the coordinates of the peculiar portion (S903), the region including the coordinates of the peculiar portion is imaged in low magnification (such as about 15,000 times) (S904).

Next, the synthetic image is synthesized by utilizing the periodicity of the image (S905) and the defect applicant is detected by executing the comparison inspection between the image taken and the synthetic reference image. A real defect judgment processing S205" similar to the real defect judgment processing S205 explained in the first embodiment is made for the defect applicant detected and the real defect is detected.

Normally, the peculiar portion coordinates detected from the design information do not contain the defect and the defect detected can be regarded as the peculiar portion classified as the wrong judgment by the real defect judgment processing S205". Therefore, the image of the partial region containing the detected defect (here, peculiar portion) is sliced from the image taken and is registered to the normal portion image database (S907).

The analysis of the geometric information of the circuit pattern may be executed by a processor of an external apparatus in place of the operation unit 113 inside the reviewing apparatus and only the coordinates of the peculiar portion as the result of analysis may be inputted to the apparatus.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description. All changes which come within the meaning and range of equivalency of the claims are therefore intended to be embraced therein.

The invention claimed is:

1. A computer-implemented method for reviewing a defect of a semiconductor device, comprising the steps of:
 a first acquisition step for acquiring an image by imaging, in a first magnification, a defect on said semiconductor device detected by an inspection device, by using a scanning electron microscope to acquire an image of a region containing said defect;
 a synthesis step for synthesizing, in a computer, a reference image of said region containing said defect acquired by said first acquisition step;
 an extraction step for extracting, in a computer, an image of a defect applicant by comparing the image of said region containing said defect acquired in the first acquisition step with said reference image synthesized said synthesis step;
 a judgment step for:
  retrieving an image, similar to the defect applicant extracted in said extraction step, from images of normal positions stored in advance, and
  judging the defect as specifiable when the image of the defect applicant extracted in the extraction step is dissimilar from the images of normal portions, and otherwise judging the defect as un-specifiable;
 a second acquisition step for obtaining images of the defect applicant, including: imaging the defect applicant in a second magnification when the defect applicant is judged as specifiable in the judgment step, and obtaining a reference image by imaging a region other than the region containing the defect of the semiconductor device in the first magnification when the defect applicant is judqed as un-specifiable;
 a detection step for detecting a defect by comparing images including a defect obtained in the first obtaining step with the reference image obtained in the second obtaining step, when the defect applicant is judged as un-specifiable; and
 an image acquisition step for acquiring an image by imaging the defect detected in the detection step in the second magnification.

2. A method for reviewing a defect of a semiconductor device according to claim 1, wherein the image of the normal portion of said semiconductor device stored in advance is an image of a part of a pattern formed on said semiconductor device.

3. A method for reviewing a defect of a semiconductor device according to claim 1, wherein the image of the normal portion of said semiconductor device stored in advance is an image of a pattern devoid of periodicity existing inside a pattern region formed on said semiconductor device and having periodicity.

4. An apparatus for reviewing a defect of a semiconductor device, comprising:
 a scanning electron microscope means for imaging a desired region on a semiconductor device and acquiring an SEM image of said desired region;
 a low magnification defect image acquisition means for imaging in a first magnification a defect on the semiconductor device detected through inspection using an inspection apparatus by controlling said scanning electron microscope means, and acquiring an image of a region containing said defect;
 a reference image synthesis means for synthesizing a reference image from the image of said region containing said defect of the first magnification acquired by controlling said scanning electron microscope means by said low magnification image acquisition means;
 a first defect applicant extraction means for comparing the image of said region containing said defect of the first magnification acquired by controlling said scanning electron microscope means by said low magnification defect image acquisition means with a reference image synthesized by said reference image synthesis means, and extracting an image of a defect applicant;
 a judgment means for judging whether or not an image of a real defect of second magnification greater than said first magnification is detectable or undetectable from the image of said defect applicant extracted by said first defect applicant extraction means by controlling said scanning electron microscope means;
 a first enlarged image acquisition means for imaging said defect applicant extracted in the second magnification and acquiring an enlarged image of said defect applicant when the image of said real defect of the second magnification is judged as detectable by controlling said scanning electron microscope means;
 a reference image acquisition means for controlling said scanning electron microscope means, imaging in the first magnification a region without said defect of said semiconductor device and acquiring a reference image when the image of said real defect of the second magnification is judged as undetectable by controlling said scanning electron microscope means;
 a second defect applicant extraction means for comparing the image containing said defect of the first magnification acquired by controlling said scanning electron microscope means by said low magnification defect image acquisition means with said reference image acquired by controlling said scanning electron microscope means by said reference image acquisition means, and extracting a defect applicant;
 a second enlarged image acquisition means for imaging in the second magnification said extracted defect applicant and acquiring an enlarged image of said defect applicant by controlling said scanning electron microscope means; and
 a storage means for storing the images of normal portions of said semiconductor device;
 wherein said judgment means is configured to:
  determine if images of normal portions of said semiconductor device that are stored in advance in said storage means include an image similar to the image of said defect applicant extracted by said first defect applicant extraction means, and
  when a similar image is determined judge the image of said real defect in the second magnification as undetectable, and otherwise judge the images of the real defect in the second magnification as detectable.

5. An apparatus for reviewing a defect of a semiconductor device according to claim 4, wherein the image of the normal portion of said semiconductor device to be stored in said storage means is an image of a part of a pattern formed on said semiconductor device.

6. An apparatus for reviewing a defect of a semiconductor device according to claim 4, wherein the image of the normal portion of said semiconductor device to be stored in said storage means is an image of a pattern devoid of periodicity existing inside a pattern region formed on said semiconductor device and having periodicity.

7. An apparatus for reviewing a defect of a semiconductor device, comprising:
 a scanning electron microscope unit configured to image a desired region on a semiconductor device and acquiring an SEM image of said desired region;

a low magnification defect image acquisition unit configured to image in a first magnification a defect on the semiconductor device detected through inspection using an inspection apparatus by controlling said scanning electron microscope unit, and acquiring an image of a region containing said defect;

a reference image synthesis unit configured to synthesize a reference image from the image of said region containing said defect of the first magnification acquired by controlling said scanning electron microscope unit by said low magnification image acquisition unit;

a first defect applicant extraction unit configured to compare the image of said region containing said defect of the first magnification acquired by controlling said scanning electron microscope unit by said low magnification defect image acquisition unit with a reference image synthesized by said reference image synthesis unit, and extracting an image of a defect applicant;

a judgment unit configured to judge whether an image of a real defect of second magnification greater than said first magnification is detectable or undetectable from the image of said defect applicant extracted by said first defect applicant extraction unit by controlling said scanning electron microscope unit, said judgment unit being configured to:
  determine if images of normal portions of said semiconductor device that are stored in advance in said storage unit include an image similar to the image of said defect applicant extracted by said first defect applicant extraction unit, and
  when a similar image is determined, judge the image of said real defect in the second magnification as undetectable, and otherwise judge the images of the real defect in the second magnification as detectable;

a first enlarged image acquisition unit configured to image said defect applicant extracted in the second magnification and acquiring an enlarged image of said defect applicant when the image of said real defect of the second magnification is judged as detectable by controlling said scanning electron microscope unit;

a reference image acquisition unit configured to control said scanning electron microscope unit, imaging in the first magnification a region without said defect of said semiconductor device and acquiring a reference image when the image of said real defect of the second magnification is judged as undetectable by controlling said scanning electron microscope unit;

a second defect applicant extraction unit configured to compare the image containing said defect of the first magnification acquired by controlling said scanning electron microscope unit by said low magnification defect image acquisition unit with said reference image acquired by controlling said scanning electron microscope unit by said reference image acquisition unit, and extracting a defect applicant;

a second enlarged image acquisition unit configured to image in the second magnification said extracted defect applicant and acquiring an enlarged image of said defect applicant by controlling said scanning electron microscope unit; and a storage unit configured to store the images of normal portions of said semiconductor device.

8. An apparatus for reviewing a defect of a semiconductor device according to claim 7, wherein the image of the normal portion of said semiconductor device stored in said storage unit is an image of a part of a pattern formed on said semiconductor device.

9. An apparatus for reviewing a defect of a semiconductor device according to claim 7, wherein the image of the normal portion of said semiconductor device stored in said storage unit is an image of a pattern devoid of periodicity existing inside a pattern region formed on said semiconductor device and having periodicity.

10. An apparatus for reviewing a defect of a semiconductor device, comprising:
  a scanning electron microscope unit configured to image a desired region on a semiconductor device and acquiring an SEM image of said desired region;
  a first acquisition unit configured to acquire in a first magnification a defect on the semiconductor device detected through inspection using an inspection apparatus, and acquiring an image of a region containing said defect;
  a synthesis unit configured to synthesize a reference image from the image of said region containing said defect acquired by the first acquisition unit;
  an extraction unit configured to compare the image of said region containing said defect acquired by said first acquisition unit with a reference image synthesized by said synthesis unit, and extracting an image of a defect applicant;
  a judgment unit configured to retrieve images of normal positions stored in advance, to judge the real defect as specifiable when the images of normal portions are all dissimilar when compared to the real defect, and to judge the real defect as unspecifiable otherwise;
  a second acquisition unit configured to, when the defect applicant is judged as specifiable, acquire an image of the defect applicant by imaging the defect applicant in a second magnification, and then obtaining a reference image by imaging a region other than the region containing the defect in the first magnification;
  a detection unit configured to, when the defect applicant is judged as unspecifiable, detect the defect by comparing a first image showing a defect, the first image obtained by the first acquisition unit, with a second image acquired by the second acquisition unit;
  an image acquisition unit configured to acquire an image by imaging in the second acquisition unit the defect detected in the detection unit;
  a storage unit configured to store the images of normal portions of said semiconductor device.

11. An apparatus for reviewing a defect of a semiconductor device according to claim 10, wherein the image of the normal portion of said semiconductor device to be stored in said storage unit is an image of a part of a pattern formed on said semiconductor device.

12. An apparatus for reviewing a defect of a semiconductor device according to claim 10, wherein the image of the normal portion of said semiconductor device to be stored in said storage unit is an image of a pattern devoid of periodicity existing inside a pattern region formed on said semiconductor device and having periodicity.

* * * * *